United States Patent [19]

Ikeda et al.

[11] Patent Number: 5,190,269
[45] Date of Patent: Mar. 2, 1993

[54] RUBBER BUSHING

[75] Inventors: Katsuhisa Ikeda, Kasugai; Akihiko Sakuragi, Komaki, both of Japan

[73] Assignee: Tokai Rubber Industries, Ltd., Komaki, Japan

[21] Appl. No.: 738,208

[22] Filed: Jul. 30, 1991

[30] Foreign Application Priority Data

Aug. 9, 1990 [JP] Japan ...................... 2-84776[U]

[51] Int. Cl.$^5$ ..................... F16M 13/00; F16F 13/00
[52] U.S. Cl. .................... 267/140.12; 267/140.3; 267/140.5; 267/141; 267/141.2; 267/152; 267/219; 267/293; 403/225
[58] Field of Search ............... 267/140.1 C, 140.1 R, 267/140.1 A, 219, 220, 152, 153, 140.2, 140.3, 140.5, 141, 141.2, 141.3, 141.4, 141.5, 141.6, 292, 293, 279, 140.11, 140.12, 140.13; 280/716; 248/562, 636, 638, 634; 180/300, 312, 902; 403/225, 228, 221

[56] References Cited

U.S. PATENT DOCUMENTS

| | | | |
|---|---|---|---|
| 2,024,728 | 12/1935 | Galson | 267/141.3 X |
| 2,958,526 | 11/1960 | Ulderup et al. | 267/292 |
| 3,893,775 | 7/1975 | Sievers et al. | 403/225 |
| 4,768,760 | 9/1988 | Le Fol | 267/219 X |
| 4,817,926 | 4/1989 | Schwerdt | 267/152 X |
| 4,883,260 | 11/1989 | Kanda | 267/140.1 C |
| 4,927,123 | 5/1990 | Schwerdt | 267/140.1 C |
| 4,936,557 | 6/1990 | Schwerdt | 267/140.1 C |
| 4,951,930 | 8/1990 | Uno et al. | 267/141.2 X |
| 5,024,425 | 6/1991 | Schwerdt | 267/141.2 X |
| 5,042,785 | 8/1991 | LeFol et al. | 267/140.1 C |

FOREIGN PATENT DOCUMENTS

| | | | |
|---|---|---|---|
| 1423391 | 11/1965 | France | 267/141.3 |
| 0157539 | 8/1985 | Japan | 267/219 |
| 0184249 | 8/1987 | Japan | 248/562 |
| 0115934 | 5/1988 | Japan | 267/293 |
| 0312535 | 12/1988 | Japan | 267/140.1 C |
| 0320331 | 12/1989 | Japan | 267/293 |
| 2192968 | 1/1988 | United Kingdom | 267/140.1 C |
| 2211271 | 6/1989 | United Kingdom | 267/293 |

Primary Examiner—Douglas C. Butler
Attorney, Agent, or Firm—Jacobson, Price, Holman & Stern

[57] ABSTRACT

Disclosed is a rubber bushing which includes an inner cylindrical member including irregularities formed on a part of an outer peripheral surface thereof, a ring made of resin, the ring disposed integrally on the outer peripheral surface on which the irregularities are formed, and the ring having an anomalous shape which is formed anomalously in radial directions with respect to a cylindrical axis of the inner cylindrical member, an elastic member made of rubber, the elastic member formed outside the inner cylindrical member, and an outer cylindrical member connected to the inner cylindrical member by way of the elastic member. Thus, the rubber bushing has an enhanced ratio of the spring characteristic in the axial direction with respect to the spring characteristic in the direction perpendicular to the axial direction. The rubber bushing having such an excellent spring characteristic can be mass-produced without increasing the conventional production cost.

12 Claims, 6 Drawing Sheets

RUBBER BUSHING

BACKGROUND OF THE INVENTION

1. Field of the Invention

The present invention relates to a rubber bushing which is employed in a suspension apparatus of an automobile, for instance.

2. Description of the Prior Art

A rubber bushing has been employed in an automobile suspension apparatus such as a semi-trailing arm type automobile suspension apparatus or the like. When a rubber bushing is employed in an automobile suspension apparatus, such a rubber bushing will be hereinafter referred to as a member mount. The rubber bushing is required to exhibit a low spring constant so as to improve the riding comfort. In particular, the rubber bushing is required to have a low spring constant in the longitudinal direction of an automobile in order to suppress the generation of the harshness, and the rubber bushing is required to have low spring constants in the longitudinal and lateral directions of an automobile in order to suppress the generation of the booming noises. However, the rubber bushing is required to have a high spring constant at least in the vertical direction of an automobile in order to improve the driving stability. Thus, the spring constant requirement for the driving stability contradicts the spring constant requirement for the riding comfort. Accordingly, the spring constants of the rubber bushing are selected appropriately in order to improve the driving stability without impairing the riding comfort.

FIGS. 9 and 10 illustrate a conventional rubber bushing. FIG. 9 is a cross sectional view of the conventional rubber bushing taken in a direction perpendicular to an axis thereof, and FIG. 10 is a cross sectional view of the conventional rubber bushing taken along an axis thereof. In FIGS. 9 and 10, an inner cylindrical metal fitting is designated at 101, and an outer cylindrical metal fitting is designated at 102. The inner cylindrical metal fitting 101 and the outer cylindrical metal fitting 102 is made integral by way of a rubber elastic member 104 which has hollows 103 and 103 therein. The hollows 103 and 103 are placed at positions which are symmetrical with each other with respect to the axis of the inner cylindrical metal fitting 101. Further, intermediate metal fittings 105 and 105 are buried in the rubber elastic member 104 in a direction which is perpendicular to the axis of the rubber bushing and which crosses the symmetrical disposing direction of the hollows 103 and 103, and the intermediate metal fittings 105 and 105 are curved in a circumferential direction.

The thus constructed rubber bushing is disposed in an automobile suspension apparatus in the following manner. Namely, the cylindrical axial direction specified by the arrows F and F' of FIG. 10 agrees with a vertical direction of an automobile body, the disposing directions of the hollows 103 and 103 specified by the arrows of U and U' of FIG. 9 agree with a longitudinal direction of an automobile body, and the disposing directions of the intermediate metal fittings 105 and 105 specified by the arrows L and L' of FIG. 9 agree with a lateral direction of an automobile body. Thus, the spring characteristic of the rubber bushing in the vertical direction of an automobile body is made soft by stresses which act in the shearing direction of the rubber elastic member 104, and the spring characteristic of the rubber bushing in the lateral direction of an automobile body is made stiff by the intermediate metal fittings 105 and 105. Consequently, the ratio of the spring characteristic in the axial direction with respect to the spring characteristic in the direction perpendicular to the axial direction is enlarged.

In addition, when the thickness of the rubber elastic member 104 is varied, the spring characteristic of the rubber elastic member 104 in the shearing direction is not varied greatly. For instance, when the thickness of a rubber elastic member is varied by 10%, the spring characteristic of the rubber elastic member in the shearing direction is varied by about 1%. On the other hand, when the thickness of the rubber elastic member 104 is varied, the spring characteristic of the rubber elastic member 104 in the compression direction is varied greatly. for instance, when the thickness of a rubber elastic member is varied by 2% to 3%, the spring characteristic of the rubber elastic member in the compression direction is varied by about 20% to 30%. The inventors of the present invention have thought of obviating the intermediate cylinders 105 and 105 by utilizing the spring characteristics of the rubber elastic member 104 while maintaining the above-described functions of the conventional rubber bushing. Namely, as illustrated in FIG. 11, a ring 106 can be formed integrally with the inner cylindrical metal fitting 101 at an intermediate portion thereof, or, as illustrated in FIG. 12, the inner cylindrical metal fitting 101 can be formed into a barrel shape at an intermediate portion thereof. However, it is extremely hard to form the inner cylindrical metal fitting 101 which has the ring 106 formed integrally therewith. Accordingly, the construction of the modified inner cylindrical metal fitting 101 would result in a problem which complicates the forming process, and in another problem which increases the overall weight of the rubber bushing. Further, it is also extremely hard to form the inner cylindrical metal fitting 101 into a barrel shape at an intermediate portion thereof.

Moreover, irregularities can be formed on the ring 106 illustrated in FIG. 11 in order to make the ring 106 a non-circular, thereby enhancing the effect of the provision of the ring 106. Namely, as the hollows 103 and 103 and the intermediate metal fittings 105 and 105 are disposed symmetrically with each other and as they appear every 90°, the ring 106 can be processed to have irregularities having different shapes which appear every 90°. However, such a construction would further complicate the forming process.

As having been described so far, it is hard and complicated to make the inner cylindrical metal fitting 101 of the conventional rubber bushing into a non-circular shape in order to enlarge the ratio of the spring characteristic in the axial direction with respect to the spring characteristic in the direction perpendicular to the axial direction. Further, it is also hard and complicated to integrally form a non-circular portion on the inner cylindrical metal fitting 101 of the conventional rubber bushing in order to enlarge the same.

SUMMARY OF THE INVENTION

It is therefore an object of the present invention to provide a rubber bushing which has an improved spring characteristic, i.e., an enhanced ratio of the spring characteristic in the axial direction with respect to the spring characteristic in the direction perpendicular to the axial direction. It is another object of the present invention to provide a rubber bushing having an inner cylindrical member which enables to integrally form a non-circular portion thereon with ease, and the inner cylindrical member firmly.

In order to accomplish the above and other objects, there is provided a rubber bushing according to the present invention, which comprises:

an inner cylindrical member including irregularities formed on a part of an outer peripheral surface thereof;

a ring made of resin, the ring disposed integrally on the outer peripheral surface on which the irregularities are formed, and the ring having a non-circular shape which is formed irregularly in radial directions with respect to a cylindrical axis of the inner cylindrical member;

an elastic member made of rubber, the elastic member formed outside the inner cylindrical member; and an outer cylindrical member connected to the inner cylindrical member by means of the elastic member.

In the construction of the rubber bushing according to the present invention, since the ring which is to be disposed integrally on the inner cylindrical member is made or resin, the ring can be formed with ease even when it has a non-circular shape, and accordingly the production cost does not rise sharply. When the inner cylindrical member is made of metal and a member of resin a connected thereto, the connection is made between dissimilar materials. generally speaking, a relatively weak connecting force is exerted therebetween. However, in the rubber bushing according to the present invention, since the irregularities are formed on the part of the outer peripheral surface of the inner cylindrical member on which the ring made of resin is to be disposed integrally, such a connecting force is enhanced between the inner cylindrical member and the ring even when the inner cylindrical member is made of metal.

As having been described so far, in accordance with the rubber bushing of the present invention, the following major advantage can be effected. Namely, it is possible to mass-produce an excellent cylindrical rubber bushing to which predetermined spring constants can be given in predetermined radial directions with respect to the axis thereof without increasing the conventional production cost.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
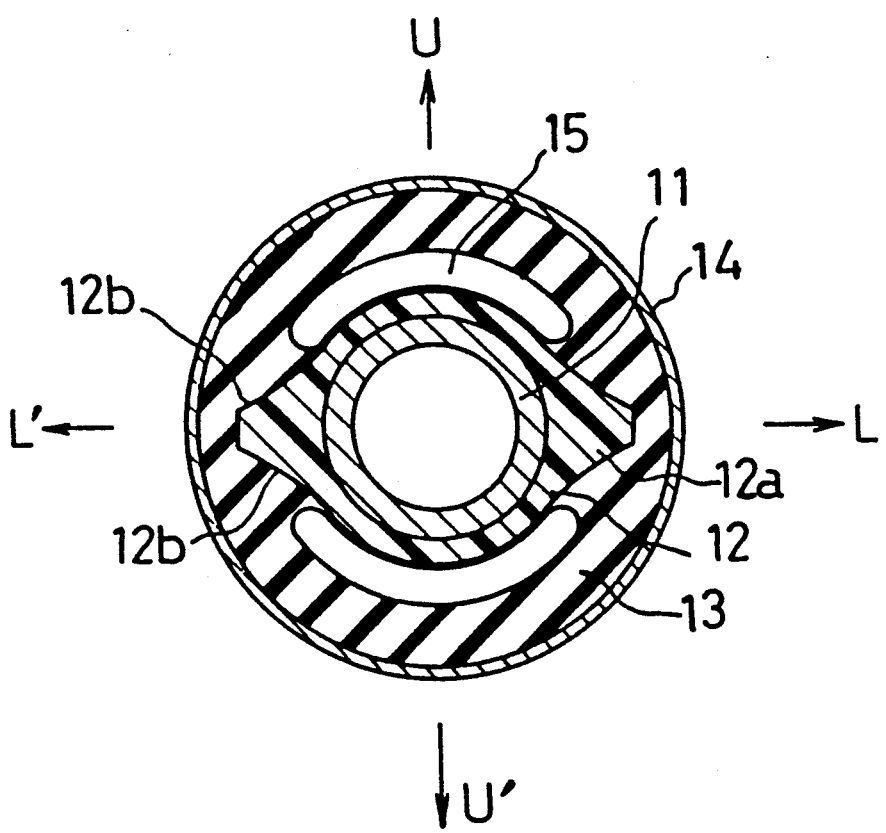
FIG. 1 is a cross sectional view of a rubber bushing of a First Preferred Embodiment according to the present invention.
Figure 2:
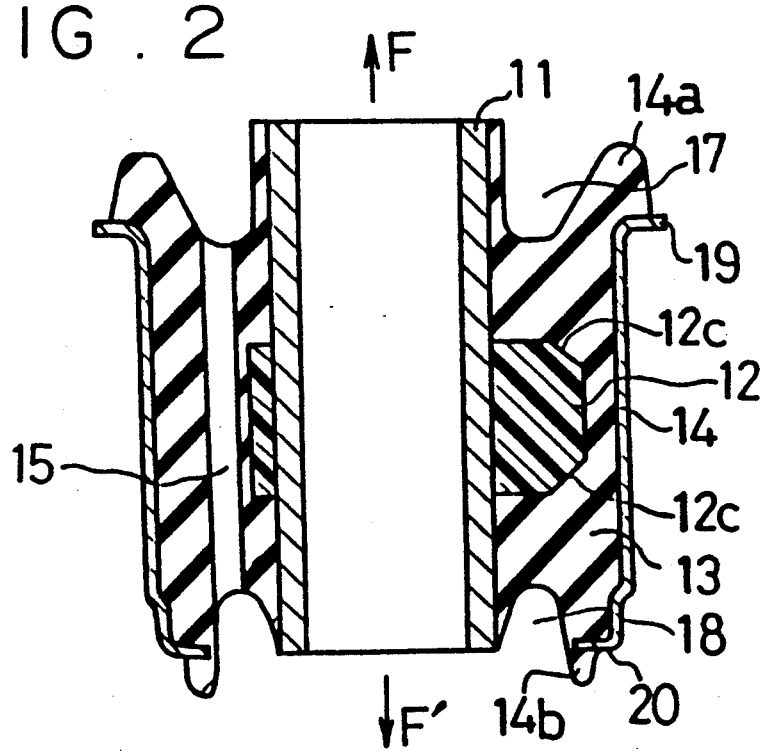
FIG. 2 is another cross sectional view of the rubber bushing of the First Preferred Embodiment.
Figure 3:
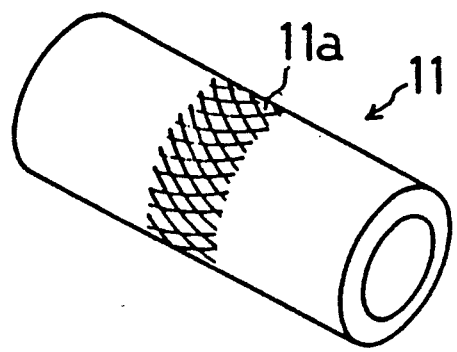
FIG. 3 is a perspective view of an inner cylindrical member of the rubber bushing of the First Preferred Embodiment.
Figure 4:
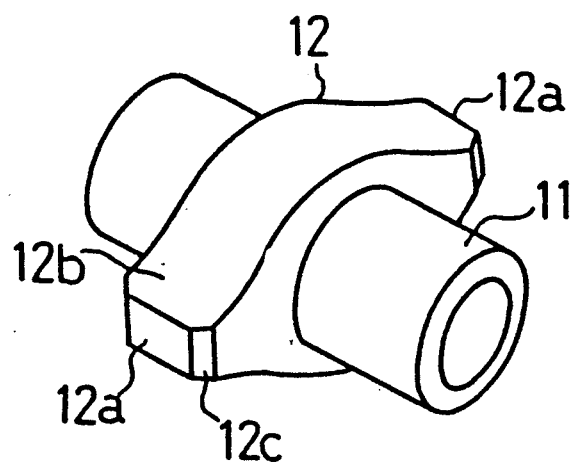
FIG. 4 is a perspective view for illustrating a construction in which the inner cylindrical member and a ring of the rubber bushing of the First Preferred Embodiment are connected.

FIGS. 1 through 4 illustrates a construction of the rubber bushing of the First Preferred Embodiment according to the present invention. FIG. 1 illustrates a cross sectional view of the rubber bushing taken in the direction perpendicular to the axis thereof, FIG. 2 illustrates another cross sectional view of the rubber bushing taken in the directions along the axis thereof (i.e., taken in the directions of the perpendicularly disposed arrows L and U' of FIG. 1), FIG. 3 illustrates an inner cylindrical metal fitting of the rubber bushing, and FIG. 4 illustrates the inner cylindrical metal fitting of which a ring of the rubber bushing is installed.

In these Figures, the inner cylindrical metal fitting is designated at 11, and it is made of metal such as iron or the like. The inner cylindrical metal fitting 11 includes the ring 12 which is disposed integrally by molding at a central portion of the inner cylindrical metal fitting 11 in the axial direction thereof. The ring 12 is molded integrally when preparing the complete inner cylindrical metal fitting 11, and it is made of hard resin. Further, an outer cylindrical metal fitting 14 is disposed so as to surround the inner cylindrical metal fitting 11 and a rubber elastic member 13.

As illustrated in FIG. 3, irregularities 11a are formed on an outer peripheral surface of the inner cylindrical metal fitting 11 on which the ring 12 is to be disposed integrally. The irregularities 11a are formed thereon by a process adapted for forming irregularities, such as knurling or the like, before molding the ring 12 integrally on the inner cylindrical metal fitting 11.

As illustrated in FIG. 4, the ring 12 is integrally disposed on the irregularities 11a. The ring 12 includes projecting portions 12a and 12a. As illustrated in FIGS. 1 and 4, the projecting portions 12a and 12a project in an axially symmetrical manner respectively in the direction of the arrows L and L' which are perpendicular to the cylindrical axis. Thus, the thickness of the ring 12 in the directions along which the projecting portions 12a and 12a project is greater than the thickness of the ring 12 in the directions of the arrows U and U' along which the projections 12a and 12a are not formed. Further, as can be seen from FIGS. 1, 2 and 4, the projecting portions 12a and 12a are formed in a truncated cone shape (or in a trapezoid cross section) at the free ends thereof. As illustrated in FIGS. 2 and 4, the truncated cone shape of the projecting portions 12a and 12a includes tapered surfaces 12a and 12c which are tapered with respect to the directions of the arrows F and F', and, as clearly seen from FIG. 4, they include tapered surfaces 12b and 12b which are tapered with respect to the direction of the arrows U and U'. With the truncated cone shape thus constructed, the abutting surfaces of the ring 12 are improved to further conform to the rubber elastic member 13.

As illustrated in FIG. 2, the rubber elastic member 13 are depressed at the end surfaces thereof which are surrounded by the inner cylindrical metal fitting 11 and the outer cylindrical metal fitting 12, and accordingly it includes annular-shaped depressions 17 and 18 at the end surfaces thereof, respectively. Further, the outer cylindrical metal fitting 14 is bent radially outward at an end of thereof so as to form an outward flange 19, and it is bent radially inward at another end thereof so as to form an inward flange 20. On the flanges 19 and 20, there are respectively provided built-up end surfaces 14a and 14b which ascend from the depressions 17 and 18 and descend to the flanges 19 and 20. Furthermore, as can be seen from FIG. 2, the diameter of the projections 12a is made larger than the inner diameter of the inward flange 20.

In addition, hollows 15 and 15 are formed in the rubber elastic member 13. As illustrated in FIG. 1, the hollows 15 and 15 are disposed perpendicularly to the directions of the arrows U and U' along which the projections 12a and 12a are not formed. As can be seen from FIG. 2, the hollows 15 and 15 are drilled through the rubber elastic member 13.

According to the rubber bushing thus constructed, the projections 12a and 12a of the ring 12 carry out functions which are identical with the functions of the internal metal fittings 105 and 105 of the conventional rubber bushing, thereby enabling to enlarge the ratio of the spring characteristic in the axial direction with respect to the spring characteristic in the directions of the arrows L and L' of FIG. 1 being perpendicular to the axial direction. Further, the ring 12 is made of resin, and it is connected to the metallic irregularities 11a of the inner cylindrical metal fitting 11 in a manner meshing with each other, thereby enhancing the connecting force exerted between the ring 12 and the inner cylindrical metal fitting 11. Furthermore, the ring 12 is bonded securely to the rubber elastic member 13 which is molded by vulcanization, thereby enhancing the integral construction among the inner cylindrical metal fitting 11, the ring 12, the rubber elastic member 13 and the outer cylindrical metal fitting 14. Moreover, the rubber bushing can be light-weight by making the ring 12 with resin. In addition, since it is easy to mold resin, resin enables to mold various complicated shapes. Hence, it is easy to project the projections 12a and 12a in accordance with specification requirements or to vary the shapes of the projections 12a and 12a in accordance therewith, for instance.

Figure 5:
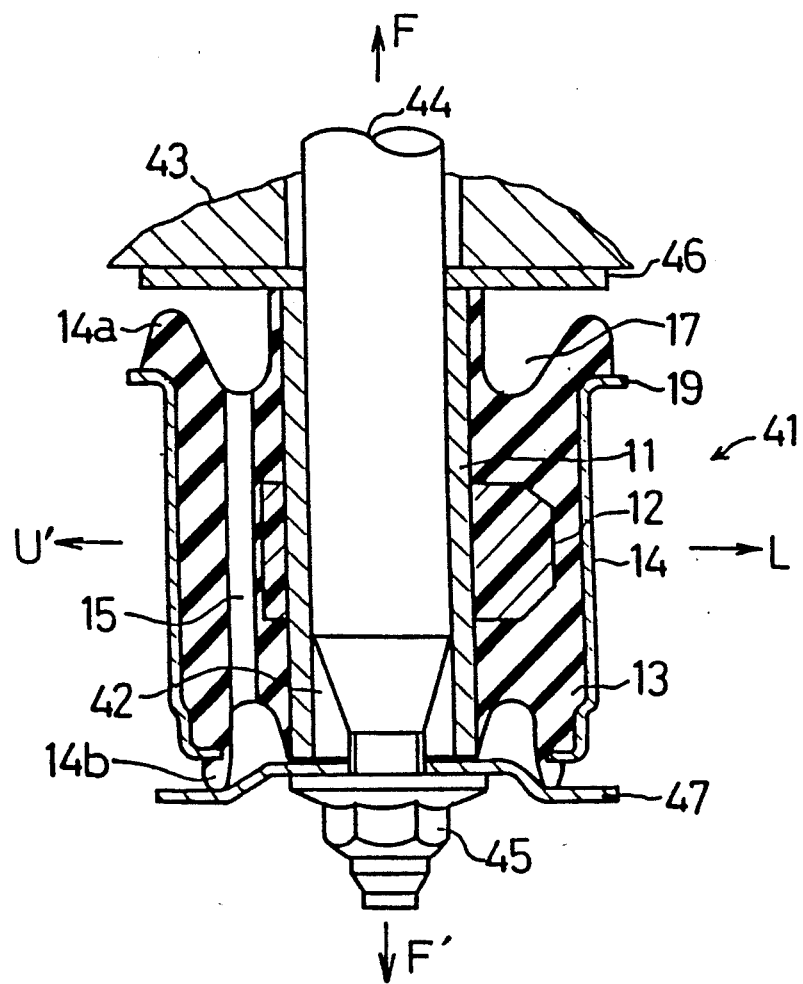
FIG. 5 is a cross sectional view of an example of an actual application in which the rubber bushing of the First Preferred Embodiment is actually installed on an automobile suspension apparatus.

For example, FIG. 5 illustrates the rubber bushing of the First Preferred Embodiment which is employed as a member mount. The rubber bushing is assembled as follows: Namely, a rod 44 extending from an automobile body 43 is inserted into a central hole 42 of the inner cylindrical metal fitting 11 of the rubber bushing. The rod 44 is fastened with a nut 45 which is screwed at the free end of the rod 44. The rubber bushing thus supports the automobile body 43. When no shock is applied to the rubber bushing, the upper built-up portion 14a of the rubber bushing is spaced away from a displacement restricting plate 46, which is disposed on the side of the automobile body 43, by a predetermined distance, but the lower built-up portion 14b thereof is brought into contact with a lower displacement restricting plate 47 which is disposed on a receiver side.

When the rubber bushing is thus assembled, the directions of the arrows F and F' of FIG. 2 agree with the vertical direction the automobile body 43, the directions of the arrows U and U' of FIG. 1 agree with the longitudinal direction the automobile body 43, and the directions of the arrow L and L' of FIG. 1 agree with the lateral direction the automobile body 43. Therefore, the rubber bushing effects the following advantages. Namely, the rubber bushing can reduce the spring constant in the longitudinal direction of the automobile body 43, and the same time it can increase the spring constants in the vertical and lateral directions of the automobile body 43. Further, in the rubber bushing of the First Preferred Embodiment, since the ring 12 is formed in a non-circular shape, it is possible to select and set spring constants which are required in the longitudinal and lateral directions, respectively. As a result, the rubber bushing of the First Preferred Embodiment can establish a spring characteristic which is optimum for the automobile body 43.

The rubber bushing of the First Preferred Embodiment which has the above-described construction is produced as follows. First, the ring 12 is disposed integrally by plastic molding with a mold on the inner cylindrical metal fitting 11 on which the irregularities 11a are formed by knurling in advance. Thus, the inner cylindrical metal fitting 11 with the ring 12 integrally disposed is prepared. Then, the inner cylindrical metal fitting 11 with the ring 12 integrally disposed and the outer cylindrical metal fitting 14 are placed in another mold, a rubber material for the rubber elastic member 13 is injected into the mold to carry out a predetermined vulcanization process. Thus, the rubber bushing is produced. In the vulcanization process, there arise strong connections between the rubber elastic member 13 and the inner cylindrical metal fitting 11 and between the outer cylindrical metal fitting 14 and the rubber elastic member 13 with the help of an adhesive which is interposed between the rubber elastic member 13 and the cylindrical metal fitting 11 and between the outer cylindrical metal fitting 14 and the rubber elastic member 13.

Second Preferred Embodiment

Figure 8:
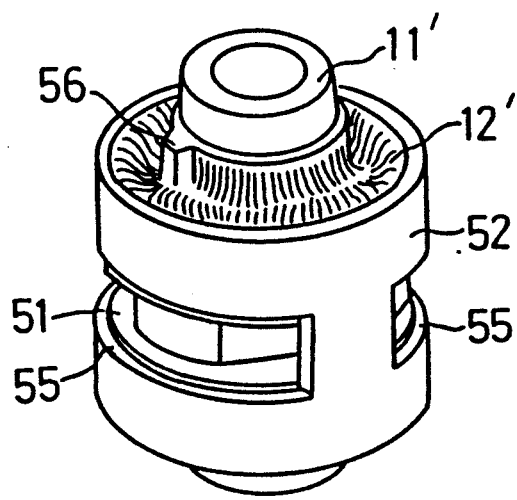
FIG. 8 is a perspective view of an internal structure or the rubber bushing of the Second Preferred Embodiment illustrated in FIGS. 6 and 7.
Figure 6:
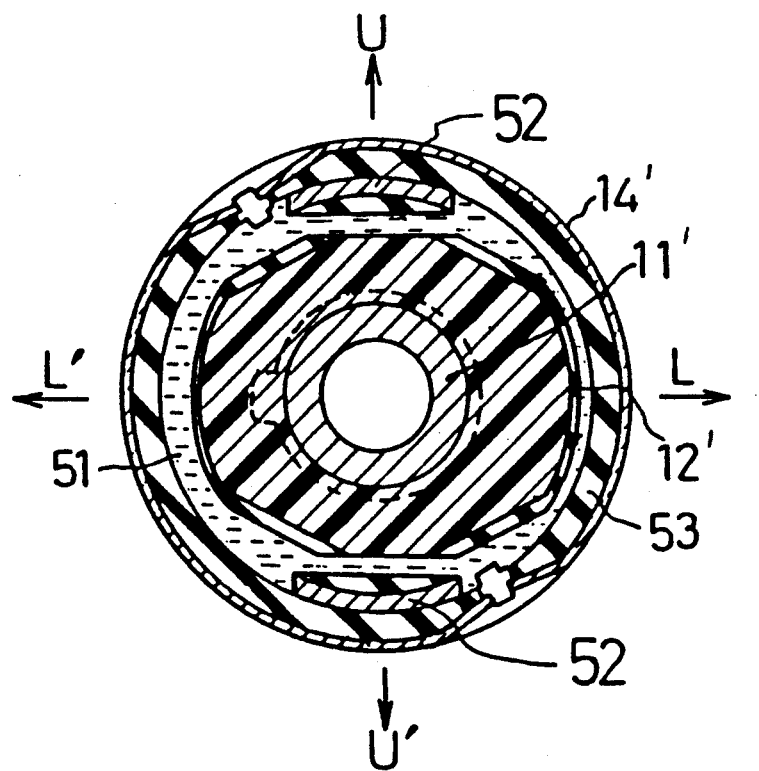
FIG. 6 is a cross sectional view of a rubber bushing of a Second Preferred Embodiment according to the present invention.

The rubber bushing of the Second Preferred Embodiment according to the present invention will be hereinafter described with reference to FIGS. 6 through 8. FIG. 6 illustrates a cross sectional view of the rubber bushing taken in the direction perpendicular to the axis thereof, FIG. 7 illustrates another cross sectional view of the rubber bushing taken in the directions along the axis thereof (i.e., taken in the directions of the perpendicularly disposed arrows L' and U' of FIG. 6, and FIG. 8 illustrates a perspective view of an inner construction of the rubber bushing.

Figure 7:
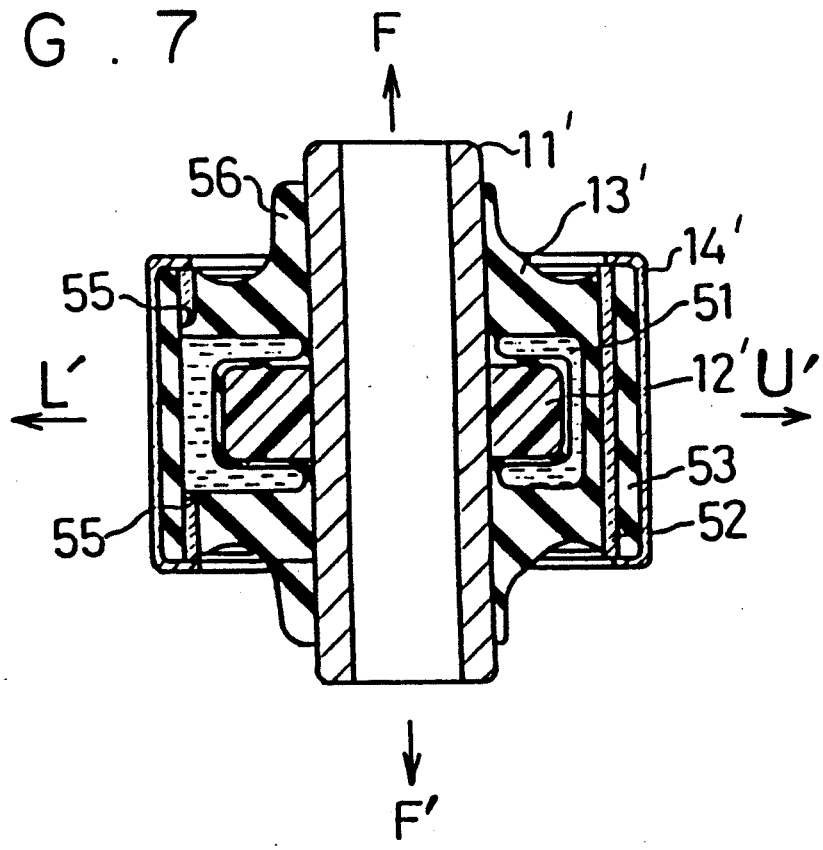
FIG. 7 is another cross sectional view of the rubber bushing of the Second Preferred Embodiment.
Figure 9:
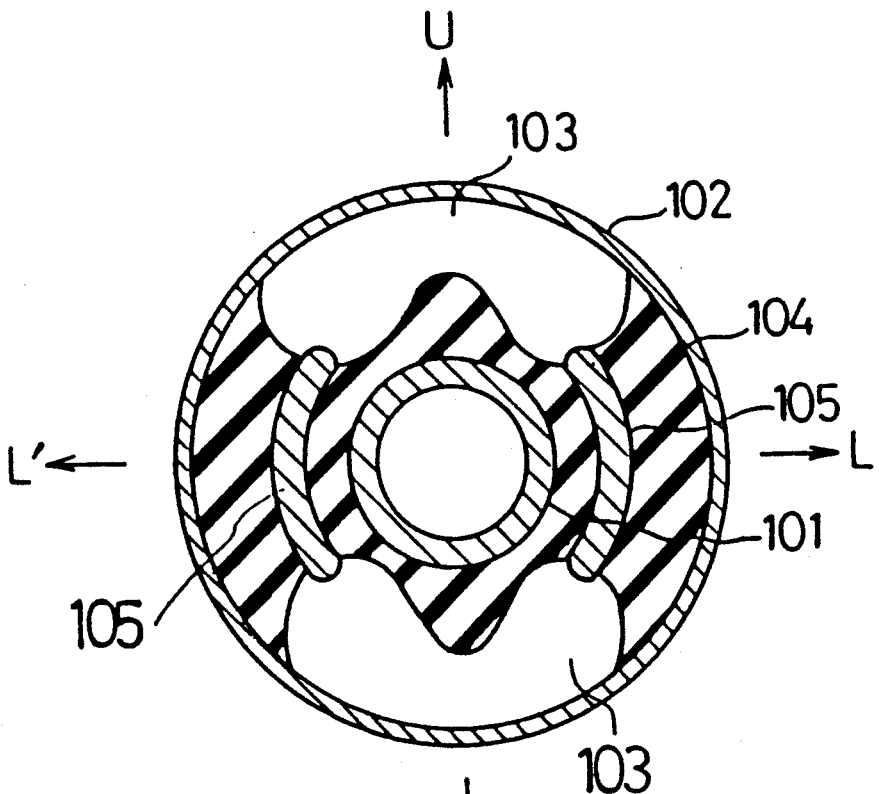
FIG. 9 is a cross sectional view of a conventional rubber bushing.
Figure 10:
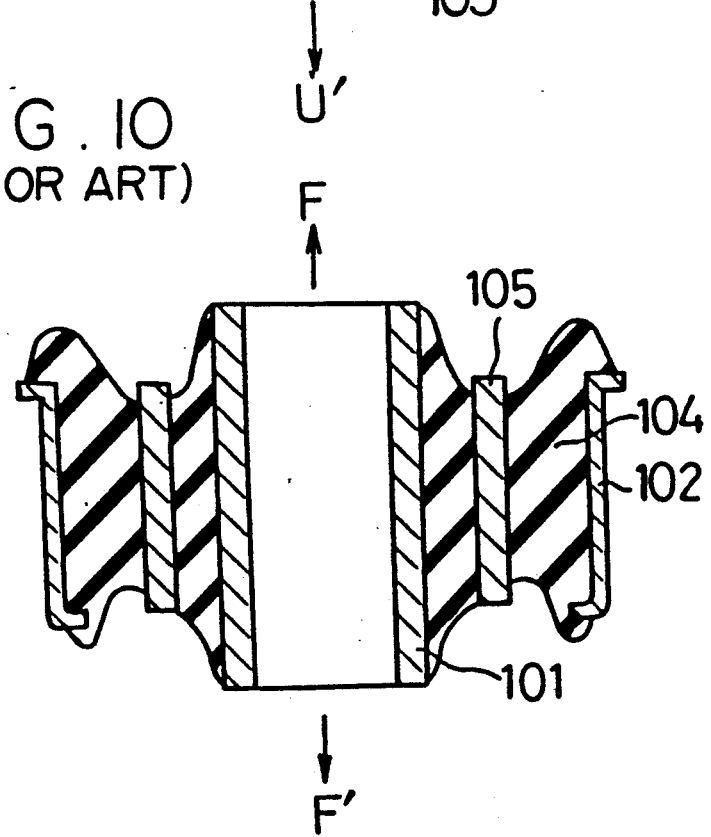
FIG. 10 is another cross sectional view of the conventional rubber bushing.
Figure 11:
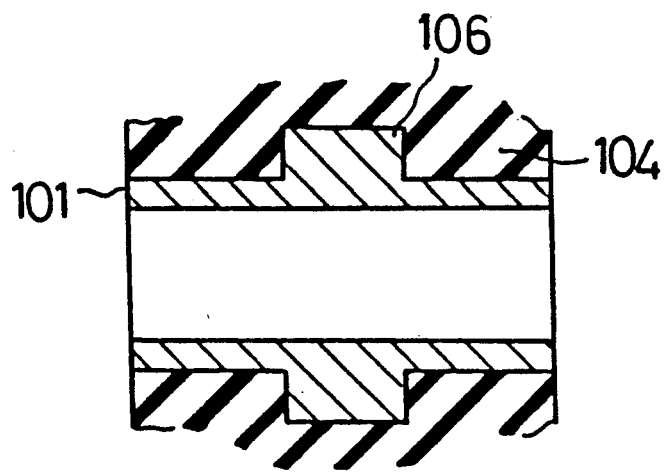
FIG. 11 is a schematic fragmentary cross sectional view of a modified version which is contemplated by the present inventors for the conventional rubber bushing.
Figure 12:
FIG. 12 is a schematic fragmentary cross sectional view of another modified version which is contemplated by the present inventors for the conventional rubber bushing.

In the rubber bushing of the Second Preferred Embodiment, a liquid chamber 51 having a letter "U" shaped cross section (as illustrated in FIG. 7) is formed therein so as to surround a non-circular shaped resin ring 12' which is disposed integrally on a substantially central portion of an inner ring 11'. As for a liquid is to be filled in the liquid chamber 51, it is possible to employ silicone or the like which has a high viscosity, or to employ a low molecular weight solvent such as water, ethylene glycol, propylene glycol or the like.

Further, as illustrated in FIGS. 7, in the rubber bushing of the Second Preferred Embodiment, an intermediate metal fitting 52 is disposed therein so as to surround a rubber elastic member 13. As can be seen from FIGS. 7 and 8, the intermediate metal fitting 52 has openings 55 and 55, and the openings 55 and 55 are formed so as to face in the directions of the arrows L and L' of FIG. 6 and so as to occupy about half of the circumferential length of the intermediate metal fitting 52. When assembled, the intermediate metal fitting 52 is disposed so that its openings 55 and 55 are overlapped on the liquid chamber 51. Furthermore, another rubber elastic member 53 is disposed outside the intermediate metal fitting 52, and accordingly an outer cylindrical metal fitting 14' is installed around the intermediate metal fitting 52 by way of the rubber elastic member 53. The intermediate metal fitting 52 and the outer cylindrical metal fitting is connected by crimping. Moreover, the ring 12' is covered with a thin rubber coating which is integral with the rubber elastic member 13. In addition, a positioning projection 56 is formed at portions which are adjacent to the both ends of the inner cylindrical metal fitting 11'.

Since the rubber bushing of the Second Preferred Embodiment includes the liquid chamber 51 which is disposed around the ring 12' and which is filled with the liquid, the ring 12' also works as a stopper. Thus, the spring characteristic of the rubber elastic member 13' can be improved further by the stopper action of the ring 12' which is combined with the vibration isolating action of the liquid.

Having now fully described the present invention, it will be apparent to one of ordinary skill in the art that many changes and modifications can be made thereto without departing from the spirit or scope of the present invention as set forth herein including the appended claims.

What is claimed is:

1. A rubber bushing, comprising:
   an inner cylindrical member having roughened portions formed on a part of an outer peripheral surface thereof;
   a ring comprising resin, said ring disposed integrally on said part of said outer peripheral surface on which said roughened portions are formed, said ring having a non-circular shape comprising a non-circular cross-section taken in a radial direction with respect to a cylindrical axis of said inner member;
   an elastic member comprising rubber, said elastic member formed outside said inner cylindrical member;
   an outer cylindrical member connected to said inner cylindrical member by means of said elastic member; and
   said non-circular shape of said ring including at least two projections which project in an axially symmetrical manner in directions perpendicular to said cylindrical axis of said inner cylindrical member.

2. The rubber bushing according to claim 1, wherein said roughened portions of said inner cylindrical member comprise knurled portions.

3. The rubber bushing according to claim 1, wherein said projections include first tapered surfaces which gradually taper from wide to narrow in said directions away from a fixed end of said ring toward a free end of said ring.

4. The rubber bushing according to claim 3, wherein said projections further include second tapered surfaces at said free end of said ring, which gradually taper from wide to narrow in a direction of said cylindrical axis of said inner cylindrical member away from a central portion of said inner cylindrical member toward a free end of said inner cylindrical member.

5. The rubber bushing according to claim 3, wherein said first tapered surfaces of said projections include curved surfaces which gradually increase in diameter in radial directions away from said fixed end of said ring to said free end of said ring.

6. The rubber bushing according to claim 1, wherein said elastic member further includes at least two hollows which are formed therein and which are disposed in an axially symmetrical manner perpendicular to the directions in which said projections extend.

7. The rubber bushing according to claim 6, wherein said rubber elastic member is disposed in a portion of an automobile body wherein said cylindrical axis of said inner cylindrical member is parallel with a vertical direction of the automobile body, said projections of said ring being disposed in a lateral direction of the automobile body and said hollow being disposed in a longitudinal direction of the automobile body.

8. The rubber bushing according to claim 6, wherein said hollows extend through said rubber elastic member.

9. A rubber bushing comprising:
   a metal inner cylindrical member,
   a ring disposed integrally on an outer peripheral surface of said inner cylindrical member and having a non-circular radial cross-section,
   an elastic rubber member formed on an outside surface of said inner cylindrical member, and
   an outer cylindrical member connected to said inner cylindrical member and said ring by means of said elastic member;
   wherein a part of said outer peripheral surface of said inner cylindrical member has a roughened surface, and said ring is a resin ring molded on said roughened surface;
   said ring including two diametrically opposed radial projections extending outward therefrom and surrounded by said elastic member.

10. A rubber bushing, comprising:
    an inner cylindrical member having roughened portions formed on a part of an outer peripheral surface thereof;
    a ring comprising resin, said ring disposed integrally on said part of said outer peripheral surface on which said roughened portions are formed, said ring having a non-circular shape comprising a non-circular cross-section taken in a radial direction with respect to a cylindrical axis of said inner member;
    an elastic member comprising rubber, said elastic member formed outside said inner cylindrical member;

an outer cylindrical member connected to said inner cylindrical member by means of said elastic member; and said elastic member further including depressions formed at both ends thereof and which descend from free ends of said inner cylindrical member and ascend to free ends of said outer cylindrical member so as to form built-up portions on the free ends of said outer cylindrical member.

11. The rubber bushing according to claim 10, wherein said elastic member further includes a liquid chamber having a "U"-shape cross section surrounding said ring and which is filled with a liquid.

12. The rubber bushing according to claim 11, wherein said rubber bushing further includes an intermediate cylindrical member which is disposed between inner cylindrical member and said outer cylindrical member and which comprise at least two openings occupying half of a circumferential length of the intermediate cylindrical member and being overlapped on said liquid chamber, and a second elastic member disposed between said intermediate cylindrical member and said outer cylindrical member.

* * * * *